Feb. 16, 1960 P. G. HYKES 2,925,304
WHEEL ATTACHING MEANS
Filed July 18, 1957

INVENTOR
Paul G. Hykes
BY
Wm. R. Glisson
ATTORNEY

# United States Patent Office 2,925,304
Patented Feb. 16, 1960

2,925,304

WHEEL ATTACHING MEANS

Paul G. Hykes, Grosse Pointe, Mich., assignor to The Budd Company, Philadelphia, Pa., a corporation of Pennsylvania Application July 18, 1957, Serial No. 672,761

2 Claims. (Cl. 301—9)

This invention relates to wheel attaching means and has for an object the provision of improvements in this art.

One of the particular objects of the invention is to provide wheel attaching means which furnishes an extremely strong and reliable attachment to the hub.

Another object is to provide very accurate piloting and securement of parts.

Another object is to provide attaching means which is adapted for use with both front and rear wheels and with both single and dual wheels.

Another object is to provide wheel attaching means in which the attaching pressure is applied at a distance around the clamping bolt holes in the disk or disks.

Another object is to provide wheel attaching means which does not place shearing stresses on the clamping bolts.

The above and other objects and various features of novelty of the invention will be apparent from the following description of certain exemplary embodiments, reference being made to the accompanying drawings thereof, wherein.

Figure 1:
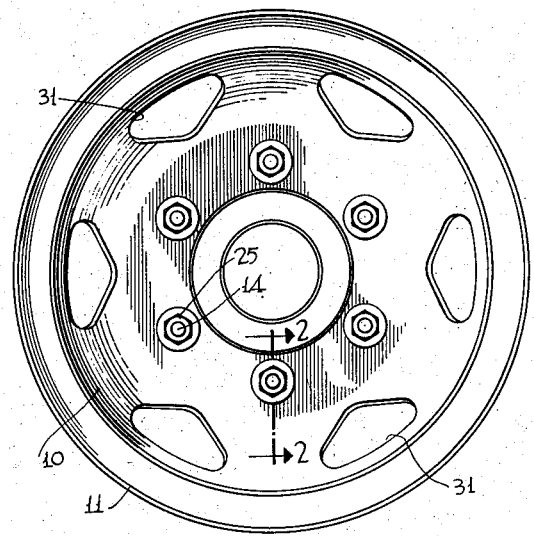
Fig. 1 is an outside or end elevation of a wheel-hub assembly provided with securement arrangements embodying the present invention.

The attaching means is employed with one or more wheel disks 10 each carrying at the outer periphery a rim 11 for mounting a tire.

The disk or disks are mounted on a wheel hub 12 provided with a plurality of clamping bolts 13 (six as shown) staked or otherwise tightly secured in the flange 14 of the hub.

At each bolt location the hub flange around the bolt holes is provided with conically countersunk portions 15 which are inwardly relieved at 16.

The disks 10 are provided with holes 20 corresponding in number and location to the clamping bolts 13, and at each hole there is provided a conical annular boss 21 terminating in a reversely conical countersunk portion 22. On the side opposite the conical bosses 21 there are corresponding conical depressions or recesses 23.

Clamping nuts 25 are provided for threading on the clamp bolts 13 to secure the wheel disks to the hub flange. The nuts are formed with an inner conical piloting projection 26 and an outer projecting circumferential clamping flange projection 27. An annular groove 28 is formed between the inner conical piloting projection 26 and the outer clamping projection 27. The hole in the nut is relieved interiorly by an enlargement 29 of greater diameter to clear the threads on the bolts to prevent injury to the threads.

Figure 2:
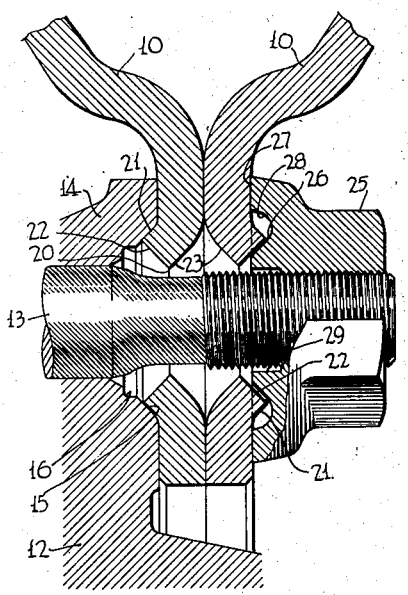
Fig. 2 is an enlarged section through a single connection, as on the line 2—2 of Fig. 1.
Figure 3:
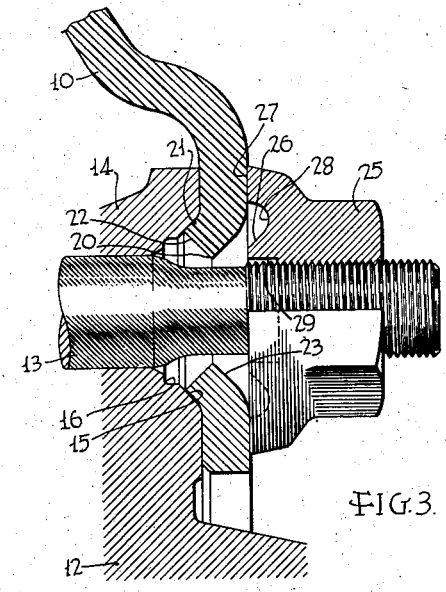
Fig. 3 is a section like Fig. 2 but showing a single disk secured to the hub.
Figure 4:
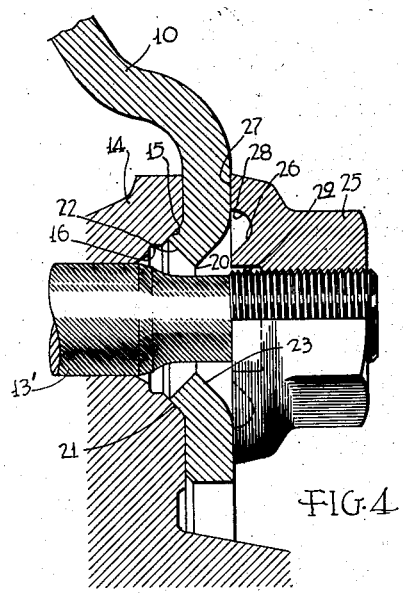
Fig. 4 is a section like Fig. 3 but showing parts built for single disk securement.

The attaching means is uniformly applicable for securing dual or single wheels on the rear, as shown respectively in Figs. 2 and 3, or for securing a single wheel on the front, as shown in Fig. 4. In Fig. 4 the shorter clamping bolt for the front is indicated by the reference numeral 13'. The parts otherwise are the same as for the rear—except that they may be made lighter—and the same reference numerals are applied to corresponding parts.

When either a single wheel or two wheels are secured to a hub, whether front or rear, the conical bosses 21 of the disk next to the hub flange are piloted into the conical recesses 15 of the hub flange. If only a single disk is secured on the hub, as shown in Figs. 3 and 4, the surrounding flat-faced flange 27 of the clamp nuts engages the flat face of the disk outside the conical opposite or back-side depression 23.

When two wheels are secured on the hub, as shown in Fig. 2, the bosses of the outer wheel disk are all faced outwardly and the conical inner portion 26 of the nuts enters the conical recess 22 and thereby the nuts pilot the disk into accurate position. Then the outer flanges 27 of the nuts engage the flat face of the disc outside the conical bosses 21 and tightly secure the disk to the hub. The grooves 28 of the nuts span and clear the bosses 21 of the wheel disk.

Very extensive laboratory and road tests have shown that the present attaching construction gives very accurate and strong securement of wheels to hubs. Whereas, with previous wheels the failures occured at the hub connection, with the present arrangement the hub connection proved so strong that failures occurred at the lightening or hand holes 31 of the disk. When these holes were made smaller to strengthen the disk a much higher load could be applied.

It is thus seen that the invention provides a new combination of elements which as a whole produces a very superior attachment of wheels to hubs. While the elements are known separately they have never been combined in the manner illustrated, so far as known, to give the improved results realized by the present invention. Withal, the construction is very simple and inexpensive and uses the same essential parts for all wheels, front or rear, single or dual.

While one embodiment has been described for purposes of illustration, it is to be understood that there may be various embodiments and modifications within the scope of the invention.

What is claimed:

1. Wheel attaching means comprising in combination, a hub provided with an annular flange, a plurality of clamping bolts secured in spaced holes in said flange, the holes having conical recesses around said bolts, a wheel disk provided with oversize holes to receive said bolts, conical bosses formed of full-thickness bent portions of said disk disposed around said disk holes fitting in the conical recesses of the hub flange to pilot the disk into proper position, the disk having conical concavities opposite the bosses and reversely directed conical concavities within said bosses, and clamp nuts threaded on said bolts, said clamp nuts having an inner conical piloting projection and an outer annular clamping projection with an annular groove between, the outer clamping projection being of a size to engage a flat portion of the disk outside the boss and the conical concavity opposite the boss and the annular groove being of a depth and width sufficient to freely receive said boss.

2. Wheel attaching means comprising in combination, a hub provided with an annular flange, a plurality of clamping bolts secured in circumferentially spaced axially directed position on said flange, the flange having conical recesses around said bolts, a first wheel disk fitting against the radial face of said flange, a plurality of oversize holes in said disk receiving said bolts, a conical boss formed of a full-thickness bent portion of said disk disposed around each hole fitting in a recess in the flange, all bosses of the disk being disposed on a common side thereof so that there is a boss in each recess, the said first wheel disk having conical recesses opposite the bosses and reversely conical recesses within said bosses, a second wheel flange identical with the first wheel flange arranged on said bolts with its bosses all directed outwardly, and clamping nuts threaded on said bolts securing said wheel disks to said hub flange, said nuts each comprising an inner conical pilot projection engaging said reverse conical recess to pilot the disk into accurate position, an outer annular flat-ended clamping projection standing at a distance outside said bosses to engage a flat surface of the second disk, and an intermediate annular recess spanning the boss, said annular groove being of a depth and width sufficient to freely receive said boss.

References Cited in the file of this patent

UNITED STATES PATENTS

| | | |
|---|---|---|
| 1,384,150 | Putnam | July 12, 1921 |
| 2,014,247 | Eksergian et al. | Sept. 10, 1935 |
| 2,453,512 | Jacobi | Nov. 9, 1948 |
| 2,597,835 | Eksergian | May 20, 1952 |
| 2,844,409 | Eksergian | July 22, 1958 |